US012662115B2

(12) United States Patent
Chong

(10) Patent No.: US 12,662,115 B2
(45) Date of Patent: Jun. 23, 2026

(54) APPARATUS AND METHOD FOR LANE FOLLOWING ASSIST

(71) Applicants:Hyundai Motor Company, Seoul (KR); Kia Corporation, Seoul (KR)

(72) Inventor: Hyok Jin Chong, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 18/387,572

(22) Filed: Nov. 7, 2023

(65) Prior Publication Data

US 2024/0199009 A1 Jun. 20, 2024

(30) Foreign Application Priority Data

Dec. 15, 2022 (KR) ........................ 10-2022-0175845

(51) Int. Cl.
 *B60W 30/12* (2020.01)
 *B62D 15/02* (2006.01)
 *G08G 1/16* (2006.01)
(52) U.S. Cl.
 CPC .......... *B60W 30/12* (2013.01); *B62D 15/025* (2013.01); *G08G 1/167* (2013.01); *B60W 2540/30* (2013.01); *B60W 2552/05* (2020.02); *B60W 2554/404* (2020.02)
(58) Field of Classification Search
 CPC ............. B60W 30/12; B60W 2540/30; B60W 2552/05; B60W 2554/404; B60W 10/20; B60W 40/072; B60W 40/09; B60W 40/10; B60W 2050/0049; B60W 2556/10; B60W 2556/50; B62D 15/025; G08G 1/167; G06F 9/06
 See application file for complete search history.

(56) References Cited

U.S. PATENT DOCUMENTS

| | | | | |
|---|---|---|---|---|
| 9,618,345 | B2 * | 4/2017 | Davidsson | G08B 21/06 |
| 2011/0029184 | A1 * | 2/2011 | Brighenti | B60W 50/14 |
| | | | | 701/31.4 |
| 2011/0231063 | A1 * | 9/2011 | Kim | B60W 30/18145 |
| | | | | 701/1 |
| 2016/0187880 | A1 * | 6/2016 | Chen | B60W 30/12 |
| | | | | 701/27 |
| 2019/0369614 | A1 * | 12/2019 | Parks | G05D 1/0088 |
| 2021/0213959 | A1 * | 7/2021 | Shahriari | G05D 1/0088 |
| 2021/0347359 | A1 * | 11/2021 | Nakatsuji | G08G 1/16 |

* cited by examiner

*Primary Examiner* — Sizo B Vilakazi
(74) *Attorney, Agent, or Firm* — Banner & Witcoff, Ltd.

(57) ABSTRACT

The apparatus for lane following assist includes a reference position setting unit configured to set a reference position which is determined to be deviated to one side within a predetermined range from a center of a lane based on a driving tendency of a driver as a new reference position for the lane keeping assist, a deviation determining unit configured to determine whether the vehicle deviates from the reference position, and an offset following control unit configured to assist steering of the vehicle such that the vehicle follows the lane along the reference position.

20 Claims, 5 Drawing Sheets

Tendency of Driver A

Tendency of Driver B

Tendency of Driver C

APPARATUS AND METHOD FOR LANE FOLLOWING ASSIST

CROSS-REFERENCE TO RELATED APPLICATION

The present application claims priority to Korean Patent Application No. 10-2022-0175845, filed on Dec. 15, 2022, the entire contents of which is incorporated herein by reference in its entirety.

BACKGROUND

A Lane Following Assist (LFA) function may be provided to assist steering of a vehicle to help the vehicle (and/or the vehicle driver) to travel along a central position of the lane.

To this end, as illustrated in FIG. 2, when a driver activates a lane keeping support (e.g., the LFA) function while driving by operating a button 10, an apparatus for lane following assist may support steering by controlling an MDPS (Motor Driven Power Steering) 30 so that the vehicle can travel along a central position of the lane after recognizing the lane by a front camera 20 provided in the vehicle.

If the front camera 20 cannot recognize the lane, the front camera 20 may recognize a front vehicle, and the apparatus may assist the vehicle (and/or the vehicle driver) to follow the front vehicle by assisting the steering of the vehicle for a predetermined time.

Since the apparatus for lane following assist only assists steering, the apparatus for lane following assist may be used as an assist apparatus for safety, and an indication signal, such as a warning signal, may be generated through the cluster 30 for safety when the driver travels without holding the steering wheel, and the vehicle may forcibly release the lane keeping assist function when the driver does not hold the steering wheel after the warning.

However, although drivers of the vehicle may have a tendency to drive to the left or right of the lane as well as to drive to the center of the lane, an apparatus for lane following assist (LFA) may control the vehicle to follow only the central position of the lane without considering the tendency of each driver.

As a result, even though the driver is driving according to his/her tendency, there is a problem in that it is recognized as if the driver is driving while being inclined to one side by the apparatus for lane following assist, which is a factor hindering the active use of the apparatus for lane following assist.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

The present disclosure relates to lane following assist and, more specifically, to an apparatus and a method for lane following assist, capable of executing steering assistance suitable for a tendency of a driver by changing a reference position by an offset value set by the operation of the driver or a position in the lane according to the driving tendency of the driver derived through normal monitoring.

The present disclosure relates to an apparatus and a method for lane following assist, capable of executing steering assistance with a tendency of a driver taken into consideration by changing the reference position by an offset value set by a driver or determined based on a driving tendency of the driver derived from a driving history of the driver.

An apparatus may comprise: one or more processors; and memory storing instructions that, when executed by the one or more processors, cause the apparatus to: set, based on a driving tendency of a driver of a vehicle, a reference position in a lane as a customized reference position for a lane keeping assistance for the driver, wherein the customized reference position is deviated, within a predetermined range, from a center of the lane; determine whether the vehicle deviates from the customized reference position; and while the driver is driving the vehicle, assist steering of the vehicle such that the vehicle follows the lane along the customized reference position.

The instructions, when executed by the one or more processors, may cause the apparatus to: obtain a driving position of the vehicle to determine a deviation degree of the driving position from the center of the lane; determine, based on the deviation degree, the driving tendency; and automatically set, based on the deviation degree of the driving tendency, the reference position in the lane as the customized reference position.

The instructions, when executed by the one or more processors, may cause the apparatus to determine whether the driver has a driving tendency to drive along the reference position in the lane, and store the reference position in the memory.

The instructions, when executed by the one or more processors, may cause the apparatus to determine one or more driving tendencies of the driver for each road type.

The instructions, when executed by the one or more processors, may cause the apparatus to: set, based on an input via a user setting menu (USM), a second reference position in a second lane for a lane keeping assistance; and adjust the second reference position by an offset value input via the USM.

The offset value may be restricted within a range of 5% of a width of the second lane.

The instructions, when executed by the one or more processors, may cause the apparatus to determine a type of a road on which the vehicle is currently traveling using road information of a navigation device in the vehicle.

The instructions, when executed by the one or more processors, may cause the apparatus to change, based on a predetermined condition being satisfied, the reference position to the center of the lane by overriding a setting of the customized reference position.

The predetermined condition may comprise at least one of: a first condition that a width of the lane is less than or equal to a predetermined width, a second condition that the vehicle is determined to be oversteered or understeered by a predetermined amount during a curved section of the lane, a third condition that a navigation device in the vehicle does not recognize a type of a road where the vehicle is traveling or that the vehicle is in an inoperable area of a global positioning system, or a fourth condition that a predetermined type of a vehicle is driving on a neighboring lane.

A method performed by a vehicle may comprise: setting, based on a driving tendency of a driver of a vehicle, a reference position in a lane as a customized reference position for a lane keeping assistance for the driver, wherein the customized reference position is deviated, within a predetermined range, from a center of the lane; determining whether the vehicle deviates from the customized reference position; and while the driver is driving the vehicle, assisting steering of the vehicle such that the vehicle follows along the customized reference position.

The setting the reference position in the lane as the customized reference position may comprise: obtaining a driving position of the vehicle to determine a deviation degree of the driving position from the center of the lane; determining, based on the deviation degree, the driving tendency; and automatically setting, based on the deviation degree of the driving tendency, the reference position in the lane as the customized reference position.

The method may further comprise determining whether the driver has a driving tendency to drive along the reference position in the lane, and storing the reference position in a memory.

The method may further comprise determining one or more driving tendencies of the driver for each road type.

The method may further comprise setting, based on an input via a user setting menu (USM), a second reference position in a second lane for a lane keeping assistance; and adjusting the second reference position by an offset value input via the USM.

The offset value may be restricted within a range of 5% of a width of the second lane.

The method may further comprise determining a type of a road on which the vehicle is currently traveling using road information of a navigation device in the vehicle.

The method may further comprise changing, based on a predetermined condition being satisfied, the reference position to the center of the lane by overriding a setting of the customized reference position.

The predetermined condition may comprise at least one of: a first condition that a width of the lane is less than or equal to a predetermined width, a second condition that the vehicle is determined to be oversteered or understeered by a predetermined amount during a curved section of the lane, a third condition that a navigation device in the vehicle does not recognize a type of a road where the vehicle is traveling or that the vehicle is in an inoperable area of a global positioning system, or a fourth condition that a predetermined type of a vehicle is driving on a neighboring lane.

A non-transitory computer-readable recording medium storing instructions that, when executed by one or more processors, cause a vehicle to perform one or more methods described herein.

According to the above-described various embodiments of the present disclosure, it is possible to perform steering assistance suitable for the driving tendency of a driver by changing the reference position of the apparatus for lane following assist to the position in the lane according to the driving tendency of the driver at normal times or the offset value set by the operation of the driver.

Also, according to the present disclosure, it is possible to perform a lane keeping support function by reflecting different driving tendency information for each driver, thereby easing discontent of users from leaning driving.

The effects obtainable from the present disclosure are not limited to the above-mentioned effects, and other effects not mentioned will be clearly understood by those skilled in the art from the following description.

These and other features and advantages are described in greater detail below.

DETAILED DESCRIPTION

Figure 1:
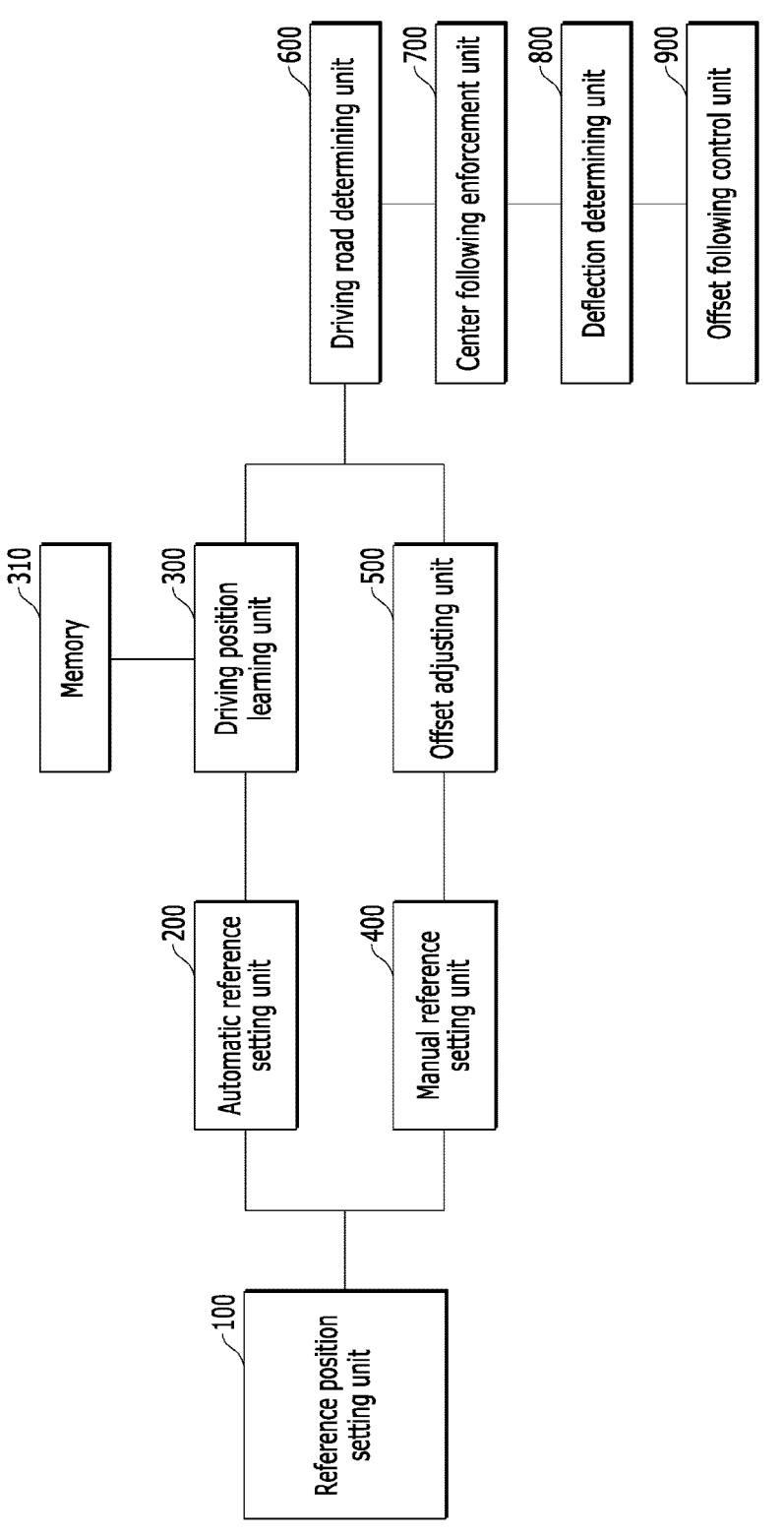
FIG. 1 is a block drawing of an apparatus for lane following assist according to the present disclosure.
Figure 2:
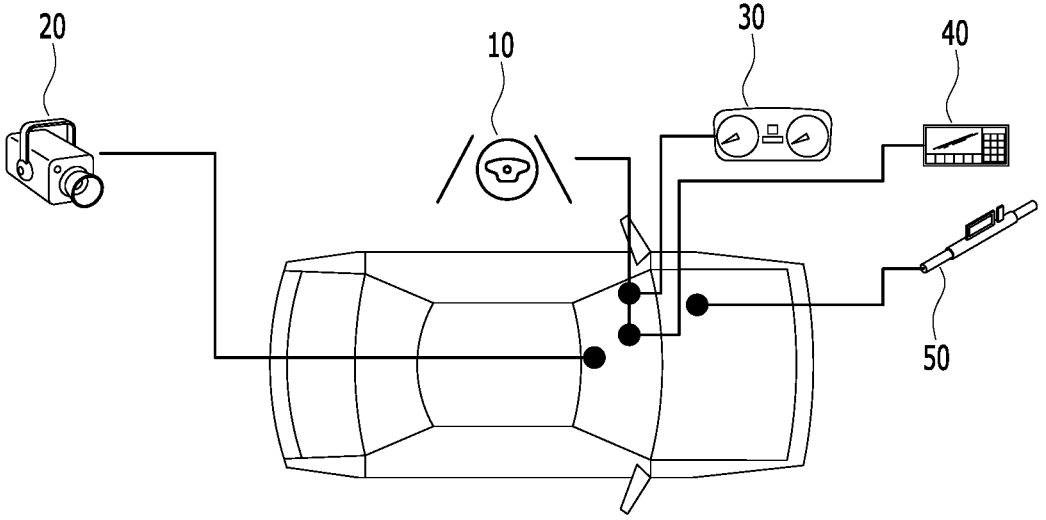
FIG. 2 is a block drawing of a vehicle equipped with an apparatus for lane following assist according to the present disclosure.

Hereinafter, various examples of the present specification will be described in detail with reference to the accompanying drawings, in which the same or similar components are assigned the same reference numerals regardless of the reference numerals, and redundant descriptions thereof will be omitted. In the following description, suffixes "module" and "unit" for constituent elements are given or used in combination with ease of description only, and do not have meanings or roles distinguished from each other. In addition, in describing the examples disclosed in the present specification, when it is determined that a detailed description of related blank technology may obscure the gist of the disclosure, the detailed description thereof may be omitted. In addition, the accompanying drawings are merely for easily understanding the features disclosed in the present specification, and the technical spirit disclosed in the present specification is not limited by the accompanying drawings, and it should be understood that all changes, equivalents, and substitutes included in the spirit and technical scope of the present disclosure are included.

Terms including ordinals such as "first", "second", etc. may be used to describe various elements, but the elements are not limited by the terms. The terms are used only for the purpose of distinguishing one component from another component.

When it is mentioned that an element is "connected" or "linked" to another element, the element may be directly connected or linked to the other element, but it should be understood that another element may exist here between. On the other hand, if it is stated that an element is "directly connected" or "directly linked" to another element, there is no intervening element. It should be understood as an example.

A singular expression includes a plural expression unless the context clearly indicates otherwise.

In this specification, it should be understood that the term "include" or "have" is intended to designate the presence of a feature, a number, a step, an operation, a component, a part, or a combination thereof described in the specification, but does not exclude the possibility of presence or addition of one or more other features, numbers, steps, operations, components, parts, or combinations thereof in advance.

Further, a something unit or a control unit such as a motor control unit (MCU), a hybrid control unit (HCU), or the like is a term widely used in the name of a controller for performing its functionality by controlling parts or components necessary for the performing in the vehicle, and does not mean a generic function unit. For example, each unit or controller may include a communication device for communicating with another unit or controller or one or more sensors for obtain necessary information, a memory for storing an OS or a logic command or computer-readable instructions, input/output information, etc. and one or more processors (e.g., computer, microprocessor, CPU, ASIC, circuitry, logic circuits, etc.) for performing judgement, calculation, determination, etc. for performing the functionality by executing the contents stored in the memory.

Hereinafter, an embodiment of the present disclosure will be described in detail with reference to FIGS. 1 to 4.

FIG. 1 is a block drawing of an apparatus for lane following assist according to the present disclosure.

Referring to FIG. 1, an apparatus for lane following assist may include a reference position setting unit 100 configured to set a reference position, which may be changed to be closer to one side of a lane within a predetermined range from the center of the lane, based on a tendency of a driver, as a new reference position for lane keeping support, a deviation determining unit 800 configured to compare a current position of a vehicle in the lane, which may be recognized by a sensor (e.g., a camera) with the reference position changed by the reference position setting unit to determine whether the vehicle deviates from the reference position, and an offset following control unit 900 configured to assist steering of the vehicle such that the vehicle follows the lane along the reference position.

Hereinafter, the position changed based on the tendency (e.g., a driving habit) of a driver by the reference position setting unit may be referred to as a reference position. The default position applied as the reference (e.g., the position not changed based on the driving habit of a driver) for lane following assist may be the central position.

The reference position setting unit 100 may include an automatic reference setting unit 200 configured to automatically set the reference position changed according to a degree of deviation learned based on the past driving record of a driver as the reference for lane following assist, and a manual reference setting unit 400 configured to set the reference position changed by a value input by the driver operating a User Setting Menu (USM) as a reference for lane following assist.

In this case, the automatic reference setting unit 200 may include the driving position learning unit 300 configured to derive the degree of deviation in which the driving position of the vehicle is deviated from the center of the lane on the basis of the driving position in the lane of the vehicle acquired by the camera provided in the vehicle during driving to learn the driving tendency.

The driving position learning unit 100 may determine whether the driver has the driving tendency to drive along the center of a lane or whether the driver has a driving tendency to drive off-center in the lane (e.g., with a bias and/or deviation toward the right or left line) and store the determination result in the memory 110.

Figure 3:
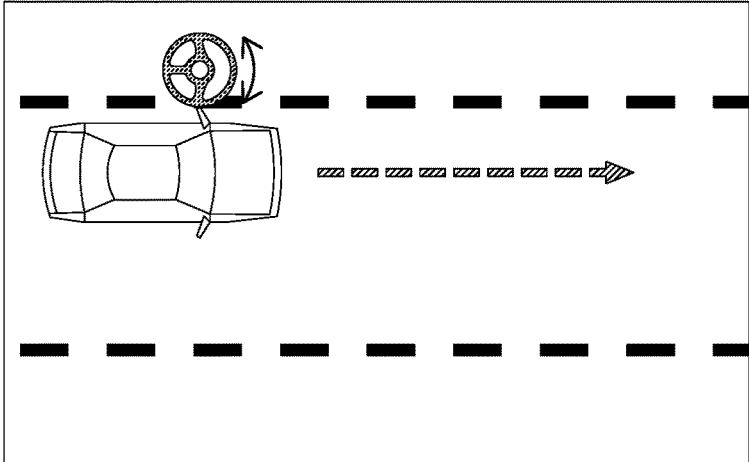
FIG. 3 is an example illustrating that driving positions in a lane are different according to the tendency of a driver.
Figure 3:
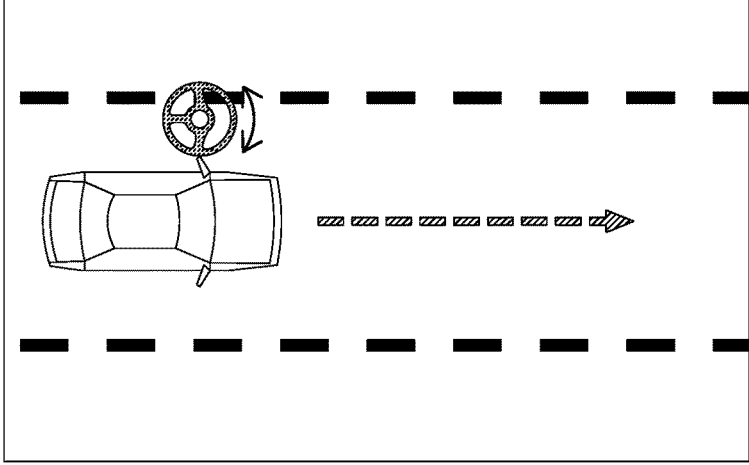
Figure 3:
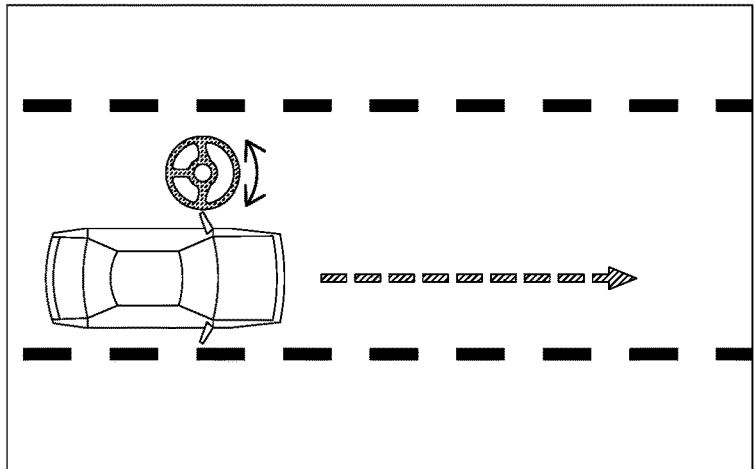

Each driver may have a different deviation of the lane position from the center of the lane. As illustrated in FIG. 3, the driving position in the lane may be slightly different according to the tendency of the driver. For example, a driver A may have a driving tendency of a deviation toward the left line of the lane, a driver B may have a driving tendency to travel in the center, and a driver C may have a driving tendency of a deviation toward the right line.

As described above, if the apparatus for lane following assist is controlled to assist various drivers having different driving tendencies with a single reference position, the drivers may feel a sense of discomfort. Accordingly, the driving position learning unit may derive and store the information about the usual driving tendency of the driver in order to minimize the sense of discomfort experienced due to the difference in driving tendency while using the apparatus for lane following assist.

To this end, the driving position learning unit 300 may derive the degree to which the position where the vehicle is traveling is deviated from the center of the lane (e.g., the direction and distance deviated from the center of the lane), by using the information collected by the camera 10 and/or a sensor while the vehicle is driven, and derive the driving tendency information based on the derived degree.

The driving position learning unit 300 may classify and store the driving tendency information for each driving road. The driving road where the vehicle may travel may be divided into a highway, a vehicle-only road, a local road, a city road, etc., and the driving tendency information for each road may be derived by learning the degree of deviation in the lane on each driving road. The learning process may comprise a machine learning and the driving position learning unit 300 may comprise a deep learning network.

As described above, the driving position learning unit 300 may store the driving tendency information for each road, which may be derived by cumulatively storing the past driving records of the vehicle (e.g., in the memory 310 provided in the vehicle). The driving tendency information for each road may be updated and stored according to a deviation degree learned by a driving record acquired during driving (e.g., after being stored in the memory 310).

The manual reference setting unit 400 may further include an offset adjusting unit 500 in which a reference position for supporting lane keeping is adjusted by a left and right offset value by which the driver may manipulate a degree of deviation from the center of the lane to the left or right using the user setting menu USM.

In some implementations, since the center of the lane is set as the reference position in the LFA, the offset adjusting unit 500 may adjust the reference position to be deviated from the central position of the lane to one side of the left side or the right side within a predetermined range by direct operation of a driver who recognizes his or her driving tendency.

In this case, the offset adjusting unit 500 may set the reference position differently according to the type of the road where the vehicle travels. The type of the road may be identified using the road information of the navigation device 30 provided in the vehicle, and the reference position of the apparatus for lane following assist may be appropriately changed based on the driving tendency for the type of the road.

The offset adjusting unit 500 may adjust the offset value input by the driver only within a predetermined range of the lane width (e.g., within 5% of the lane width or any other range). Accordingly, the offset adjusting unit 500 may be configured such that the offset value may not be changed outside the predetermined range to avoid any potential risks associated with the safety of the driver. As an example, the offset adjusting unit 500 may adjust the reference position about 15 cm to the left or right from the center of the lane in the case of a road having a lane width of 3.5 m.

The apparatus may further include a driving road determining unit 600 configured to determine a type of a road where the vehicle is currently driving using road information on a location detection device (e.g., a navigation, a global positioning system (GPS), etc.) provided in the vehicle.

As described above, by recognizing the type of the road where the vehicle is currently traveling by the driving road determining unit 600, as the type of the road where the vehicle is traveling is changed, the reference position for supporting the lane maintenance may be automatically changed based on the driving tendency information for each road or may be adjusted to the offset value that the driver directly sets for each type of the road.

The deflection determining unit 800 may compare a current position in the lane of the vehicle, which may be collected by the camera 10 during driving, with the reference position changed by the reference position setting unit, and determine whether the vehicle is further deviated from the reference position in the lane.

If the deviation determining unit 800 determine that the vehicle deviates from the reference position, the offset following control unit 900 may assist the steering of the MDPS 30 to correct the position in the lane so that the vehicle travels while following the reference position.

Accordingly, the driver may feel that steering is assisted so that the driver can drive at a position within the lane corresponding to his or her driving tendency information by the apparatus for lane following assist, and thus may use the apparatus for lane following assist without a sense of inconvenience during driving the vehicle.

Even when the reference position is changed by the reference position setting unit 100, the apparatus may forcibly change the reference position to the central position of the lane based on a determination that the reference position corresponds to a predetermined condition of exception for safe driving, so that the center following enforcement unit 700 assists the vehicle to travel at the central position of the lane.

For example, if there is a determination that the width of the lane is less than or equal to a predetermined width and thus too narrow, the center following enforcement unit 700 may forcibly change the reference position to the central position of the lane since the lane position deviated to one side may cause an accident with the vehicle driving on the adjacent lane.

For example, if the width of the lane is 1.8 m and 10% of the width of the vehicle is considered as the margin, if the width of the lane is inclined to one side at 2.5 m or less, there is a concern that the margin area overlaps with the adjacent lane. Accordingly, if the width of the lane is narrower than or equal to the predetermined width, the reference position may be forcibly changed to the central position of the lane.

If there is a determination of risk that the vehicle is understeered, causing it to be pulled outward and cross the outer side line, or oversteered causing it to be pulled inward and cross the inner side line while driving on a curved section of the lane such as the intersection IC or the junction JC, the center following enforcement unit 700 may forcibly change the reference position to the central position of the lane.

In other words, if there is a determination that more than 10% of the width of the vehicle may be deviated outward or inward from the central position of the lane due to the curvature of the lane, the reference position may be forcibly changed to the central position of the lane.

Also, the center following enforcement unit 700 may not distinguish the type of a road on which the vehicle is traveling when the navigation device fails to provide information about the type of the road, or the vehicle runs in an area in which the Global Positioning System (GPS) does not properly provide accurate location of the vehicle, and therefore, the reference position may be forcibly changed to the central position of the lane in order to reduce the risk of an accident due to lack of information.

In an example, if there is a determination that a predetermined type of a heavy vehicle (e.g., a cargo truck or a bus is travelling in a neighboring), the center following enforcement unit 700 may forcibly change the reference position to the center of the lane in order to minimize potential risks of collision with the heavy vehicle.

To this end, the center following enforcement unit 700 may obtain the type information of the surrounding vehicles which are travelling in the adjacent lane by use of a front radar, a front side radar, and/or a camera of the vehicle.

The reference position setting unit, the automatic reference setting unit, the driving position learning unit, the manual reference setting unit, the offset adjusting unit, the driving road determination unit, the deviation determining unit, the offset following control unit, and/or the center following enforcement unit may be implemented by using one or more processors and memory (e.g., programmed and mounted in a control device such as an Electronic Control Unit (ECU) provided in the vehicle, the apparatus for lane following assist in the form of software, and/or may be provided in the form of hardware such as a module). If the apparatus for lane following assist or the controller is implemented in the form of software, the present disclosure is applied without adding material costs for changing hardware of the device for lane following assist, thereby improving marketability.

In this way, reflecting different driving tendency information from each driver may provide a support function of customized lane maintenance, thereby providing better user experience for the drivers of the vehicle (e.g., with regard to leaning driving).

Hereinafter, a method for lane following assist will be described with reference to FIG. 4.

Figure 4:
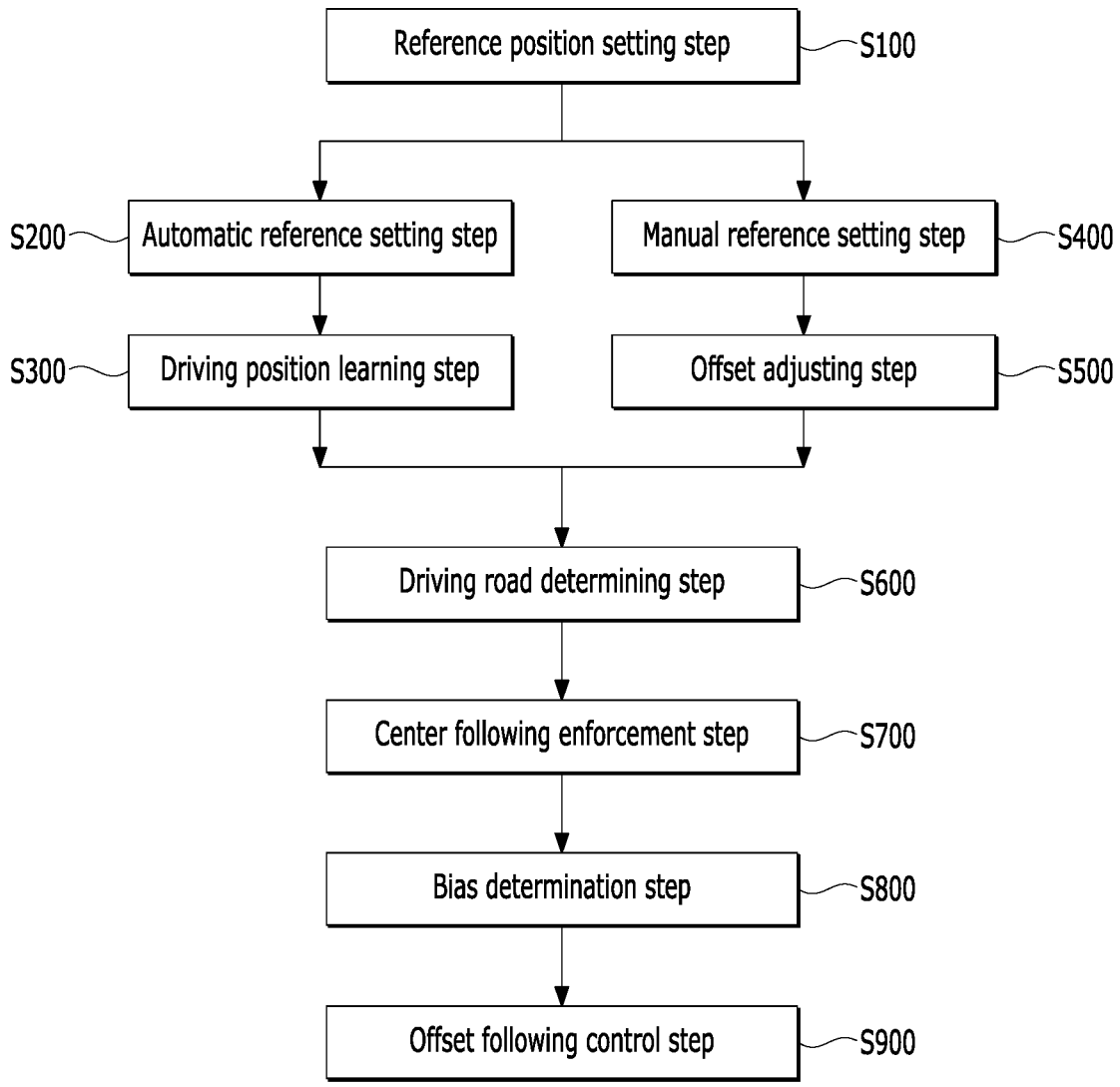
FIG. 4 is a block drawing of a method for lane following assist according to the present disclosure.

FIG. 4 is a block drawing of a method for lane following assist according to the present disclosure.

Referring to FIG. 4, a method for lane following assist may include a reference position setting step S100 of setting the reference position changed to be deviated to one side within the predetermined range from the center of the lane based on the tendency of a driver as the new reference position for operating an apparatus for lane following assist, a bias determination step S800 (e.g., a deviation degree determination step) of determining whether the lane position of the vehicle deviates from the reference position (e.g., in comparison to a current position in the lane of the vehicle, which is being driven by a controller provided in the apparatus for lane following assist, with the changed reference position), and an offset following control step S900 of assisting steering of the vehicle by the controller so that the vehicle follows the reference position when the vehicle deviates from the reference position.

The reference position setting step S100 may include an automatic reference setting step S200 of automatically setting a reference position changed according to a degree of average deviation of a driver learned based on the past driving record of the driver as the reference for lane following assist, and a manual reference setting step S400 of setting a reference position changed by a value input by the driver operating a User Setting Menu (USM) as the reference for lane following assist.

The automatic reference setting step S200 may include a driving position learning step S300 of deriving a degree of deviation in which the driving position of the vehicle is deviated from the center of the lane on the basis of the driving position in the lane of the vehicle acquired by the camera provided in the vehicle during driving to learn the driving tendency.

In the driving position learning step (S300), there is a determination whether the driver has the tendency to drive in the center of the lane or to drive in a biased manner to one of the right side or the left side of the lane by monitoring the usual driving situation of the driver, and the determined driving tendency may be stored in the memory.

In the in-lane driving position learning step S300, the degree to which the driving position of the vehicle is deviated from the center of the lane (e.g., the direction and distance deviated from the center) may be derived using the information collected by the camera or the sensor while the vehicle is driving, and driving tendency information may be derived based on the derived degree.

In the driving position learning step S300, the driving tendency information may be classified and stored for each driving road where the vehicle has driven. For example, the driving tendency information for each road can be derived by dividing the driving road where the vehicle can drive into a highway, a vehicle-only road, a local road, and a city road, etc., and learning the degree of deviation within the lane on each driving road.

The manual reference setting step S400 may further include an offset adjusting step S500 in which the reference position for lane following assist is adjusted by the left and right offset value in which the driver manipulates the degree of deviation from the center of the lane to the left or right using the user setting menu USM.

In the offset adjusting step S500, the reference position may be differently set according to the longitudinal direction of the road on which the vehicle travels. In other words, the type of the road may be identified using the location detection device (e.g., the navigation device, the GPS device, etc.) provided in the vehicle, and the reference position of the apparatus for lane following assist may be appropriately changed based on the driving tendency information of the driver with respect to the type of road.

The method may further include a driving road determining step S600 of determining the type of the road where the vehicle is currently driving using road information of the location detection device (e.g., the navigation device, the GPS device, etc.) provided in the vehicle.

As described above, since the type of the road where the vehicle is travelling may be identified from the driving road determining step S600, as the type of the road on which the vehicle is travelling is changed, the reference position for supporting lane maintenance may be automatically changed based on the driving tendency information for each road or may be adjusted to the offset value that is directly set by the driver for each road type.

Also in the determining of the deviation (S800), there may be a determination whether the vehicle is deviated from the reference position in the lane by comparing the current position in the lane of the vehicle collected by the camera during driving with the reference position changed in the setting of the reference position.

In the offset following control step S900, if there is a determination that the vehicle is deviated from the reference position from the deviation determining step S800, the position in the lane may be adjusted so that the vehicle travels while following the reference position adjusted to the reference position by assisting the steering of the MDPS.

The method may further include a center following enforcement step S700 of compulsorily changing the reference position to the central position of the lane if there is a determination that the predetermined condition of exception for safe driving is satisfied even when the reference position is changed in the reference position setting step to assist the vehicle to travel at the central position of the lane.

In the center following enforcement step S700, if there is a determination that the width of the lane is too narrow to be equal to or smaller than a predetermined width as one of the exceptional condition, the reference position may be forcibly changed to the central position of the lane.

Further, in the center following enforcement step S700, if there is a determination of risk that the vehicle is pulled outward and cross of the outer line of the lane or pulled inward and cross the inner line of the lane during a sharp curvature section of the lane such as the intersection IC or the branch point JC, the reference position may be forcibly changed to the central position of the lane.

In the center following enforcement step S700, even if the type of the road cannot be distinguished due to, for example, a failure of the navigation device or the vehicle runs in a GPS unavailable area, the reference position may be forcibly changed to the central position of the lane.

In the center following enforcement step S700, even if it is determined that the large vehicle is travelling in a neighboring lane, the reference position may be compulsorily changed to the central position of the lane in order to minimize safety risks and/or the driver's sense of being threatened.

Meanwhile, the present disclosure described above may be implemented as computer-readable codes in a medium in which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc.

The apparatus for lane following assist may comprise a reference position setting unit configured to set a reference position which is determined to be biased to one side within a predetermined range from a center of a lane based on a driving tendency of a driver as a new reference position for the lane keeping assist, a deviation determining unit configured to determine whether the vehicle deviates from the reference position, and an offset following control unit configured to assist steering of the vehicle such that the vehicle follows the lane along the reference position.

In at least one embodiment of the present disclosure, the reference position setting unit comprises a driving position learning unit configured to obtain a driving position of the vehicle to determine a deviation degree of the driving position from a center of a lane and learn the driving tendency based on the deviation degree, and an automatic reference setting unit configured to automatically set the reference position based on the deviation degree of the driving tendency.

In at least one embodiment of the present disclosure, the driving position learning unit is further configured to determine whether the driver has a driving tendency to drive along the center or a left or right-biased position of the lane and store the determination result in a memory.

In at least one embodiment of the present disclosure, the driving position learning unit is further configured to classify and store in a memory the driving tendency by road.

In at least one embodiment of the present disclosure, the reference position setting unit comprises a manual reference setting unit configured to set a reference position of the lane following assist according to an input by a user setting menu (USM), and an offset adjusting unit configured to adjust the reference position by an offset value input by the USM.

In at least one embodiment of the present disclosure, the offset value is restricted within a range of 5% of a width of the lane.

In at least one embodiment of the present disclosure, the apparatus further comprises a driving road determining unit configured to determine a type of a road on which the vehicle is currently traveling using road information of a navigation device provided in the vehicle.

In at least one embodiment of the present disclosure, the apparatus further comprises a center following enforcement unit configured to compulsorily change the reference position to a central position of the lane when a predetermined condition is satisfied.

In at least one embodiment of the present disclosure, the predetermined condition includes at least one of a first condition that a width of the lane is less than or equal to a predetermined width, a second condition that the vehicle is determined to be oversteered or understeered by a predetermined amount during a curve section of the lane, a third condition that a navigation device provided in the vehicle does not distinguish a type of a road where the vehicle is traveling or that the vehicle is in a shadow area of a global positioning system, or a fourth condition that a predetermined type of a vehicle is driving on a neighboring lane.

A method for lane following assist may include a reference position setting step of setting a reference position, which is determined to be biased to one side within a predetermined range from a center of a lane based on a driving tendency of a driver as a new reference position for the lane following assist, a deviation determining step of determining whether the vehicle deviates from the reference position, and an offset following control step of assisting steering of the vehicle such that the vehicle follows along the reference position.

In at least one embodiment of a method according to the present disclosure, the reference position setting step includes a driving position learning step of obtaining a driving position of the vehicle to determine a deviation degree of the driving position from a center of a lane and learn the driving tendency based on the deviation degree, and an automatic reference setting step of automatically setting the reference position based on the deviation degree of the driving tendency.

In at least one embodiment of a method according to the present disclosure, the driving position learning step further includes determining whether the driver has a driving tendency to drive along the center or a left or right-biased position of the lane and store a result of the determining in a memory.

In at least one embodiment of a method according to the present disclosure, the driving position learning step further includes classifying and storing in a memory the driving tendency by road.

In at least one embodiment of a method according to the present disclosure, the reference position setting step includes a manual reference setting step of setting a reference position of the lane following assist according to an input by a user setting menu (USM), and an offset adjusting step of adjusting the reference position by an offset value input by the USM.

In at least one embodiment of a method according to the present disclosure, the offset value is restricted within a range of 5% of a width of the lane.

In at least one embodiment of a method according to the present disclosure, the method may further include a driving road determination step of determining a type of a road on which the vehicle is currently traveling using road information of a navigation device provided in the vehicle.

In at least one embodiment of a method according to the present disclosure, the method may further include a center following enforcement step of compulsorily changing the reference position to a central position of the lane when a predetermined condition is satisfied.

In at least one embodiment of a method according to the present disclosure, the predetermined condition includes a first condition that a width of the lane is less than or equal to a predetermined width, a second condition that the vehicle is determined to be oversteered or understeered by a predetermined amount during a curve section of the lane, a third condition that a navigation device provided in the vehicle does not distinguish a type of a road where the vehicle is traveling or that the vehicle is in a shadow area of a global positioning system, or a fourth condition that a predetermined type of a vehicle is driving on a neighboring lane.

A non-transitory computer-readable recording medium, according to an embodiment of the present disclosure, has a program for executing at least one of the method described above recorded thereon.

Figure 5:
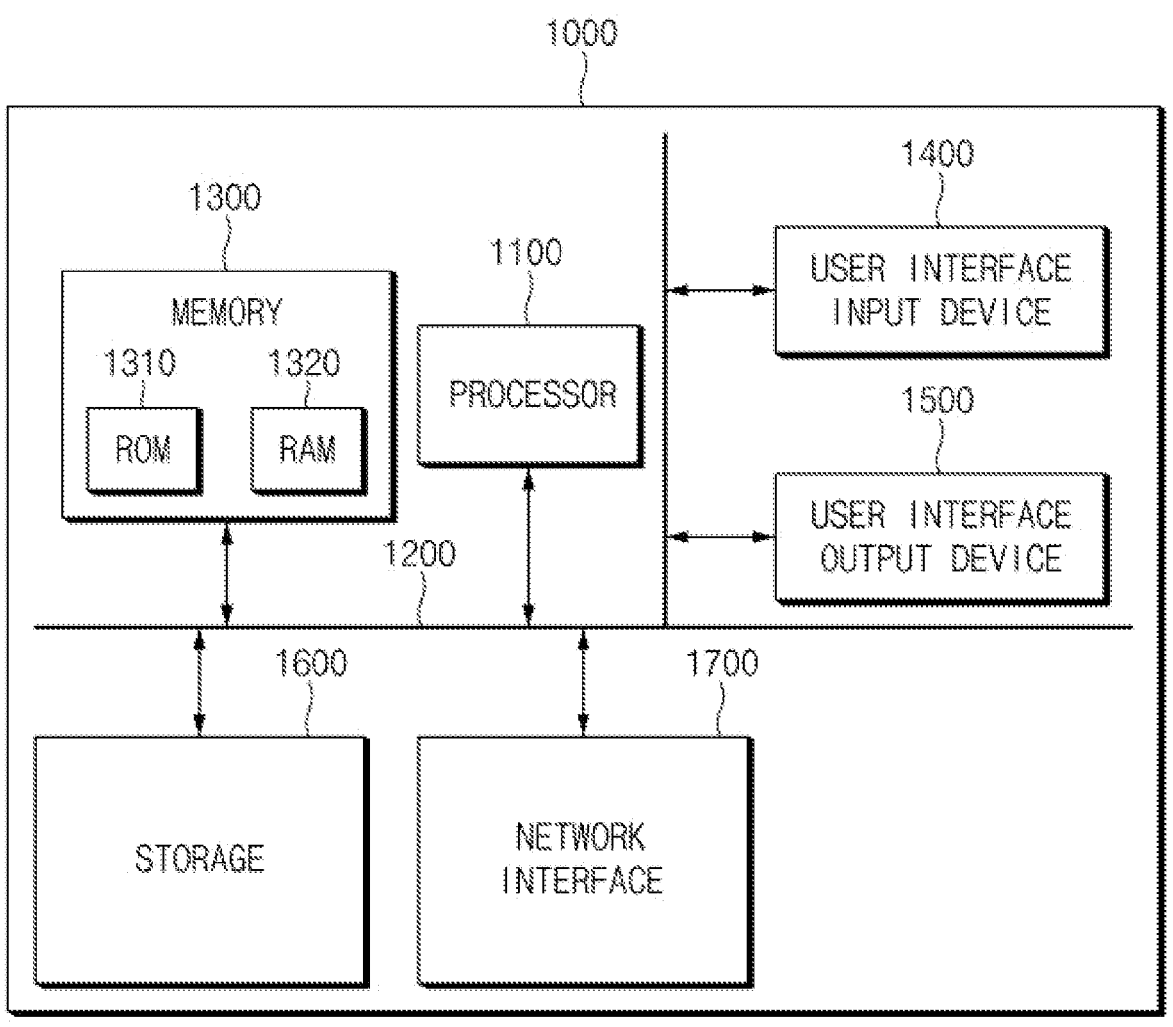
FIG. 5 shows a computing system implementing an apparatus for lane following assist.

FIG. 5 illustrates a computing system for performing an autonomous driving control method.

Referring to FIG. 10, a computing system 1000 may include at least one processor 1100, a memory 1300, a user interface input device 1400, a user interface output device 1500, storage 1600, and a network interface 1700, which may be connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the features disclosed in the specification may be directly implemented with a hardware module, a software module, or a combination of the hardware module and the software module, which may be executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively or additionally, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Accordingly, the above detailed description should not be construed as being limited in all aspects and should be considered as illustrative. The scope of the present disclosure should be determined by rational interpretation of the appended claims, and all changes within the equivalent scope of the present disclosure are included in the scope of the present disclosure.

What is claimed is:

1. An apparatus comprising:

one or more processors; and memory storing instructions that, when executed by the one or more processors, cause the apparatus to:

set, based on a driving tendency of a driver of a vehicle, a reference position in a lane as a customized reference position for a lane keeping assistance for the driver, wherein the customized reference position is deviated, within a predetermined range, from a center of the lane, and wherein the driving tendency is determined based on accumulated past driving records;

determine whether the vehicle deviates from the customized reference position; and while the driver is driving the vehicle, assist steering of the vehicle such that the vehicle follows the lane along the customized reference position.

2. The apparatus of claim 1, wherein the instructions, when executed by the one or more processors, cause the apparatus to:

obtain a driving position of the vehicle to determine a deviation degree of the driving position from the center of the lane;

determine, based on the deviation degree, the driving tendency; and automatically set, based on the deviation degree of the driving tendency, the reference position in the lane as the customized reference position.

3. The apparatus of claim 2, wherein the instructions, when executed by the one or more processors, cause the apparatus to determine whether the driver has a driving tendency to drive along the reference position in the lane, and store the reference position in the memory.

4. The apparatus of claim 2, wherein the instructions, when executed by the one or more processors, cause the apparatus to determine one or more driving tendencies of the driver for each road type.

5. The apparatus of claim 1, wherein the instructions, when executed by the one or more processors, cause the apparatus to:

set, based on an input via a user setting menu (USM), a second reference position in a second lane for a lane keeping assistance; and adjust the second reference position by an offset value input via the USM.

6. The apparatus of claim 5, wherein the offset value is restricted within a range of 5% of a width of the second lane.

7. The apparatus of claim 1, wherein the instructions, when executed by the one or more processors, cause the apparatus to determine a type of a road on which the vehicle is currently traveling using road information of a navigation device in the vehicle.

8. The apparatus of claim 1, wherein the instructions, when executed by the one or more processors, cause the apparatus to change, based on a predetermined condition being satisfied, the reference position to the center of the lane by overriding a setting of the customized reference position.

9. The apparatus of claim 8, wherein the predetermined condition comprises at least one of: a first condition that a width of the lane is less than or equal to a predetermined width, a second condition that the vehicle is determined to be oversteered or understeered by a predetermined amount during a curved section of the lane, a third condition that a navigation device in the vehicle does not recognize a type of a road where the vehicle is traveling or that the vehicle is in an inoperable area of a global positioning system, or a fourth condition that a predetermined type of a vehicle is driving on a neighboring lane.

10. A method performed by a vehicle, the method comprising:

setting, based on a driving tendency of a driver of the vehicle, a reference position in a lane as a customized reference position for a lane keeping assistance for the driver, wherein the customized reference position is deviated, within a predetermined range, from a center of the lane, and wherein the driving tendency is determined based on accumulated past driving records;

determining whether the vehicle deviates from the customized reference position; and while the driver is driving the vehicle, assisting steering of the vehicle such that the vehicle follows along the customized reference position.

11. The method of claim 10, wherein the setting the reference position in the lane as the customized reference position comprises:

obtaining a driving position of the vehicle to determine a deviation degree of the driving position from the center of the lane;

determining, based on the deviation degree, the driving tendency; and automatically setting, based on the deviation degree of the driving tendency, the reference position in the lane as the customized reference position.

12. The method of claim 11, further comprising determining whether the driver has a driving tendency to drive along the reference position in the lane, and storing the reference position in a memory.

13. The method of claim 11, further comprising determining one or more driving tendencies of the driver for each road type.

14. The method of claim 10, further comprising:

setting, based on an input via a user setting menu (USM), a second reference position in a second lane for a lane keeping assistance; and adjusting the second reference position by an offset value input via the USM.

15. The method of claim 14, wherein the offset value is restricted within a range of 5% of a width of the second lane.

16. The method of claim 10, further comprising determining a type of a road on which the vehicle is currently traveling using road information of a navigation device in the vehicle.

17. The method of claim 10, further comprising changing, based on a predetermined condition being satisfied, the reference position to the center of the lane by overriding a setting of the customized reference position.

18. The method of claim 17, wherein the predetermined condition comprises at least one of: a first condition that a width of the lane is less than or equal to a predetermined width, a second condition that the vehicle is determined to be oversteered or understeered by a predetermined amount during a curved section of the lane, a third condition that a navigation device in the vehicle does not recognize a type of a road where the vehicle is traveling or that the vehicle is in an inoperable area of a global positioning system, or a fourth condition that a predetermined type of a vehicle is driving on a neighboring lane.

19. A non-transitory computer-readable recording medium storing instructions that, when executed by one or more processors, cause a vehicle to perform the method of claim 10.

20. A method performed by a vehicle, the method comprising:

setting, based on a driving tendency of a driver of the vehicle, a reference position in a lane as a customized reference position for a lane keeping assistance for the driver, wherein the customized reference position is deviated, within a predetermined range, from a center of the lane;

determining a type of a road on which the vehicle is currently traveling using road information of a navigation device in the vehicle;

determining whether the vehicle deviates from the customized reference position; and while the driver is driving the vehicle, assisting steering of the vehicle such that the vehicle follows along the customized reference position.

\* \* \* \* \*